United States Patent
Kang

[19]

[11] Patent Number: 6,128,776
[45] Date of Patent: Oct. 3, 2000

[54] METHOD FOR MANAGING SOFTWARE IN CODE DIVISION MULTIPLE ACCESS (CDMA) BASE STATION SYSTEM OF PERSONAL COMMUNICATION SYSTEM

[75] Inventor: Sung-Min Kang, Seoul, Rep. of Korea

[73] Assignee: Samsung Electronics Co., Ltd., Rep. of Korea

[21] Appl. No.: 09/057,688

[22] Filed: Apr. 9, 1998

[30] Foreign Application Priority Data

May 7, 1997 [KR] Rep. of Korea ...................... 97-17559

[51] Int. Cl.[7] .................................................. G06F 9/445
[52] U.S. Cl. .................................. 717/11; 717/5; 717/6; 717/7; 717/8; 717/9; 717/10
[58] Field of Search ................................... 395/708, 709, 395/710, 712; 717/7, 6, 5

[56] References Cited

U.S. PATENT DOCUMENTS

| | | | |
|---|---|---|---|
| 5,724,610 | 3/1998 | Han et al. ................................. | 710/22 |
| 5,757,846 | 5/1998 | Vasudevan ............................... | 375/200 |
| 5,799,010 | 8/1998 | Lomp et al. .............................. | 370/335 |
| 5,835,911 | 11/1998 | Nakagawa et al. ...................... | 707/203 |
| 5,845,148 | 12/1998 | Ichikawa et al. ........................ | 395/828 |
| 5,909,437 | 6/1999 | Rhodes et al. ........................... | 370/349 |
| 5,991,332 | 11/1999 | Lomp et al. .............................. | 375/206 |

OTHER PUBLICATIONS

Zhang et al., "Forward Link Capacity for Integrated Voice/Data Traffic in CDMA Wireless Local Loops", IEEE, pp. 1578–1582, 1998.

*Primary Examiner*—Tariq R. Hafiz
*Assistant Examiner*—Ted T. Vo
*Attorney, Agent, or Firm*—Dilworth & Barrese

[57] ABSTRACT

A method for managing software in a code division multiple access (CDMA) base station system of a personal communication system (PCS) includes the step of setting a processor type to each processor in the base station system, where each processor type is a string of bits including a plurality of bits equal to 0 and one bit equal to 1. Similar processor types have an identical string of bits and dissimilar processor types differ in that bit positions equal to 1 do not overlap. A software type is set to each software in the base station system, where each software type is a string of bits including a plurality of bits equal to 0 and at least one bit equal to 1. Each software corresponds to at least one processor by having a bit equal to 1 located in the same position as the bit equal to 1 in the processor type string. Software is downloaded to a download requesting processor when the result of an AND operation between the bit position of the processor type equal to 1 and the corresponding bit position of the software type equals 1.

15 Claims, 10 Drawing Sheets

METHOD FOR MANAGING SOFTWARE IN CODE DIVISION MULTIPLE ACCESS (CDMA) BASE STATION SYSTEM OF PERSONAL COMMUNICATION SYSTEM

BACKGROUND OF THE INVENTION

1. Field of the Invention

The present invention relates to a code division multiple access (CDMA) base station system of a personal communication system (PCS), and more particularly, to a method for managing software in the base station system.

2. Description of the Related Art

Figure 1:
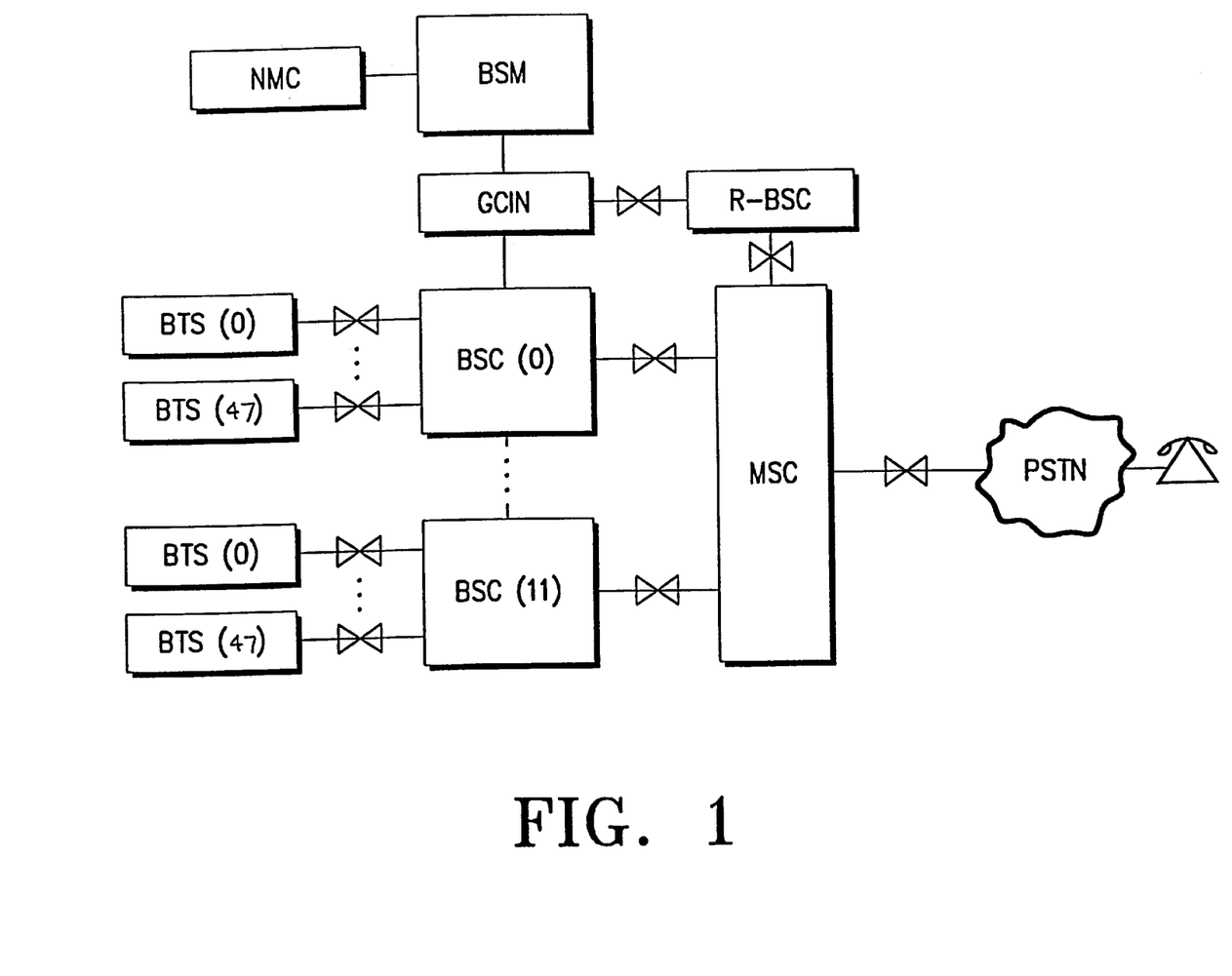
FIG. 1 is a block diagram of a conventional code division multiple access (CDMA) base station system of a personal communication system (PCS)

A conventional CDMA base station system of a PCS is illustrated in FIG. 1. A base station manager (BSM) operates base station controllers (BSCs) and base station transceiver systems (BTSs), and carries out the maintenance thereof. Further, the BSM allows an operator to input a command, input/output processing information, and load data and software to the BSCs and BTSs. A gateway communication interconnection network (GCIN) connects the BSM to respective blocks. A BSM can be connected to twelve BSCs. The BSCs match radio and wire channels between the BTSs and a mobile switching center (MSC), process calls, and manage the BTSs. A BSC can be connected to forty-eight BTSs.

Figure 2:
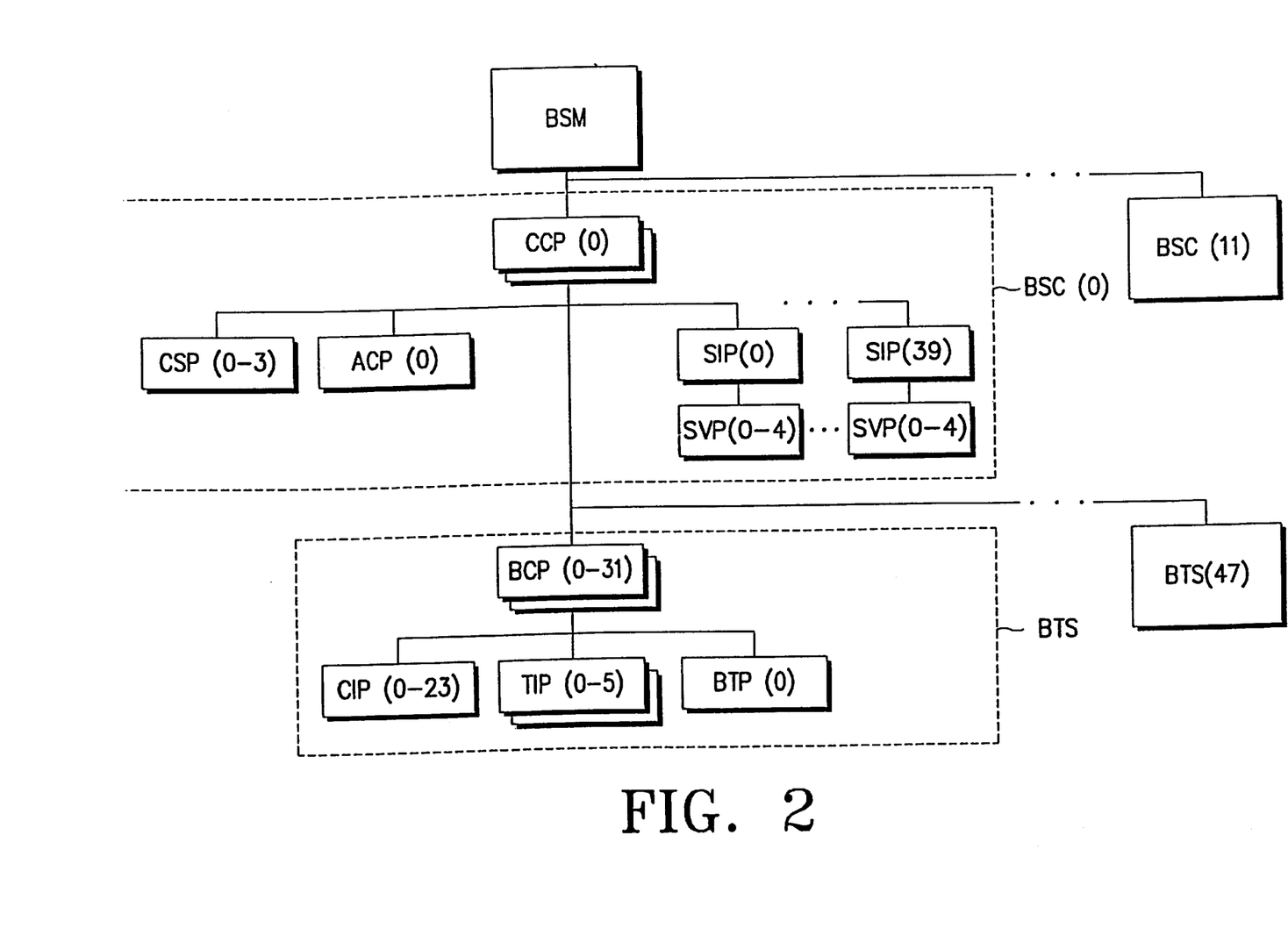
FIG. 2 is a block diagram illustrating the internal processors of a base station controller (BSC) and a base station transceiver system (BTS) shown in FIG. 1.

FIG. 2 is a block diagram illustrating the internal processors of a BSC and a BTS shown in FIG. 1. One of the internal processors of the BSC, a call control processor (CCP), controls a call, allocates radio resources of the BSC, and initializes the BSC and the BTS.

Another internal processor of the BSC, a common channel signaling processor (CSP), implements an IS-634 level 2 function for accurately transmitting signal information between the MSC and the BSC without error. One BSC can contain four CSPs. An alarm control processor (ACP) within the BSC controls a link test block (LTB) (not shown) to test a bit error rate (BER) of a trunk between the BSC and the BTS. One BSC can contain 40 SIPs.

As stated above, a single BSC can be connected to forty-eight BTSs. One of the internal processors of the BTS, a dual BTS control processor (BCP), controls a call, processes data, and loads the BCP. In addition to the BCP, the BTS includes twenty-four channel element interface processors (CIPs), four dual transceiver interface processors (TIPs) and one BTS test processor (BTP).

The above base station system is operated by a load sharing control system wherein the processors load data and execution software (hereinafter, referred to as "software") and implement their unique functions. It is to be appreciated that the processors are arranged in a hierarchical structure. For example, the CCP receives software from the BSM and stores the software in a specific memory. The received software is necessary for the ACP, CSPs, SIPs, SVP (Selector Vocoder Processor), BCP, CIPs, TIPs and BTP, which are lower processors of the CCP. Accordingly, upon receipt of a loading request from the ACP, the CCP downloads the corresponding previously received software to the ACP. Similarly, if there is a loading request from the CSP, the CCP downloads the corresponding previously loaded software to the CSP. Further, if the SIP requests the CCP to load software, the CCP downloads the previously loaded software of the SIP and its lower processor, the SVP, to the SIP.

If the BCP requests the CCP to load software, the CCP downloads to the BCP the previously loaded software of the BCP and its lower processors, the CIP, TIP and BTP. The BCP stores the downloaded software of the CIP, TIP and BTP as well as its own downloaded software in a memory. If there is a loading request from either the CIP, TIP or BTP, the BCP reads only the software corresponding to the specific requesting processor and downloads the corresponding software to the specific processor.

Thus, an upper processor stores the software of a plurality of corresponding lower processors. Therefore, if a specific lower processor requests its respective upper processor to load software, the upper processor reads only the software of the specific lower processor out of a plurality of software. For this, the upper processor should include identification (ID) data for distinguishing the software of the lower processor. The specific software for loading other software from an upper processor to a lower processor is known as a loader software. The loader software controls the loading to a corresponding processor by using the ID data.

Processors may be added or deleted in the course of operating and developing a CDMA base station system of a PCS. Software corresponding to each processor may also be added or deleted. Accordingly, since the ID data is sequentially assigned to the software or the processor, the ID data should be modified according to the addition and deletion of processors, data or software. Moreover, if the ID data is modified, the loader software of each processor should be altered.

SUMMARY OF THE INVENTION

It is therefore an object of the present invention to provide a method for managing software in a CDMA base station system of a PCS which does not require modification of loader software even if a processor or software is added or deleted in the course of operating and developing the base station system.

In accordance with one aspect of the present invention, a method for managing software in a code division multiple access (CDMA) base station system of a personal communication system (PCS) includes the step of setting a processor type to each processor in the base station system, where each processor type is a string of bits including a plurality of bits equal to 0 and one bit equal to 1. Similar processor types have an identical string of bits and dissimilar processor types differ in that bit positions equal to 1 do not overlap. A software type is set to each software in the base station system, where each software type is a string of bits including a plurality of bits equal to 0 and at least one bit equal to 1. Each software corresponds to at least one processor by having a bit equal to 1 located in the same position as the bit equal to 1 in the processor type string. Software is downloaded to a download requesting processor when the result of an AND operation between the bit position of the processor type equal to 1 and the corresponding bit position of the software type equals 1.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF PREFERRED EMBODIMENTS

In the following description, numerous specific details are set forth to provide a more thorough understanding of the present invention. It will be apparent, however, to one skilled in the art that the present invention may be practiced without these specific details. In other instances, well known features and constructions have not been described so as not to obscure the present invention.

A processor table and a software table used in the present invention are shown below. Table 1 is the processor table, which provides identification (ID) data for the processors of the CDMA base station system in the PCS.

TABLE 1

| PI | Processor Name | Processor Type | Processor Address |
|---|---|---|---|
| 0 | CCP00_a | 0000 0000 0001 | 0x0c000000 |
| 1 | CCP00_b | 0000 0000 0001 | 0x0c010000 |
| 2 | BCP0000_a | 0000 0000 0010 | 0x08000000 |
| 3 | BCP0000_b | 0000 0000 0010 | 0x08010000 |
| 4 | BCP0001_a | 0000 0000 0010 | 0x08100000 |
| 5 | BCP0001_b | 0000 0000 0010 | 0x08110000 |
| 6 | BCP0002_a | 0000 0000 0010 | 0x08200000 |
| 7 | BCP0002_b | 0000 0000 0010 | 0x08210000 |
| . | . | . | . |
| a | SIP0000 | 0000 0000 0100 | 0x0c2000ff |
| a + 1 | SIP0001 | 0000 0000 0100 | 0x0c2010ff |
| a + 2 | SIP0002 | 0000 0000 0100 | 0x0c2020ff |
| . | . | . | . |
| b | SVP0000 | 0000 0000 1000 | 0x0c200000 |
| b + 1 | SVP0001 | 0000 0000 1000 | 0x0c200010 |
| . | . | . | . |
| c | CIP0000 | 0000 0001 0000 | 0x080800ff |
| c + 1 | CIP0001 | 0000 0001 0000 | 0x080810ff |
| . | . | . | . |
| d | TIP0000_a | 0000 0010 0000 | 0x080400ff |
| d + 1 | TIP0000_b | 0000 0010 0000 | 0x080410ff |
| . | . | . | . |
| e | BTP0000 | 0000 0100 0000 | 0x0802c000 |
| e + 1 | BTP0001 | 0000 0100 0000 | 0x0812c000 |
| . | . | . | . |
| f | CSP0000 | 0000 1000 0000 | 0x0c0c0000 |
| . | . | . | . |
| g | ACP0000 | 0001 0000 0000 | 0x0c040000 |

Table 1 contains the following four columns: "PI" (Program Identifier); "Processor Name"; "Processor Type"; and "Processor Address". Similar processors are associated with similar "Processor Types" and dissimilar processors are associated with dissimilar "Processor Types." For example, processors CCP00_a and CCP00_b have the same "Processor Type" of 0000 0000 0001, with the last bit equal to 1. The remaining "Processor Types" do not have their last bit equal to 1. Similarly, processors BCP0000_a, BCP0000_b, BCP0001_a, BCP0001_b, BCP0002_a, and BCP0002_b have the same "Processor Type" of 0000 0000 0010, with the second to last bit equal to 1. The remaining "Processor Types" do not have their second to last bit equal to 1. The "Processor Address" provides information for discriminating between processors of different types as well as processors of the same type.

Table 2 is the software table, which provides data for discriminating between the softwares stored in a memory 16 of the BSM of the CDMA base station system in the PCS.

TABLE 2

| SI | Software Name | Software Type |
|---|---|---|
| 0 | p_bcp0000 | 0000 0000 0010 |
| 1 | p_bcp0001 | 0000 0000 0010 |
| . | . | . |
| a | shell | 0000 0000 0001 |
| a + 1 | cmslx | 0000 0000 0001 |
| a + 2 | crax | 0000 0000 0001 |
| a + 3 | crmx | 0000 0000 0001 |
| . | . | . |
| b | rmos_bcp | 0000 0000 0010 |
| b + 1 | rmos_sip | 0000 0000 0100 |
| b + 2 | rmos_svp | 0000 0000 1000 |
| b + 3 | plx | 0000 0000 1110 |
| b + 4 | bcox | 0000 0000 0010 |
| b + 5 | brmx | 0000 0000 0010 |
| . | . | . |
| c | tmnx | 0000 0000 0100 |
| c + 1 | tcox | 0000 0000 1000 |
| c + 2 | smnx | 0000 0000 1000 |
| c + 3 | cdspx | 0000 0000 1000 |
| . | . | . |
| d | rmos_cip | 0000 0001 0000 |
| . | . | . |
| e | rmos_tip | 0000 0010 0000 |
| . | . | . |
| f | rmos_btp | 0000 0100 0000 |
| . | . | . |
| g | rmos_csp | 0000 1000 0000 |
| h | rmos-asp | 0001 0000 0000 |

Table 2 contains the following three columns: "SI (Software Identifier); "Software Name";and "Software Type". The "Software Type" corresponds to the "Processor Type" shown in Table 1. More specifically, a specific software is downloaded to all the processors which have a "Processor Type" with a 1 in at least one of the same positions as a 1 in the "Software Type" of the specific software. Thus, it is to be appreciated that while the "Software Type" of a specific software may have multiple is located at multiple locations, a processor only needs a single bit equal to 1 in a position corresponding to a 1 bit in the "Software Type" to receive the specific software. For example, since the "Software Type" of software p1x ("Software Name") is 0000 0000 1110, the software p1x is downloaded to the processors whose "Processor Types" have a 1 at the second, third, or fourth bits from the last bit. That is, the software p1x is downloaded to the following processors: processors having a "Processor Type" equal to 0000 0000 0010 (i.e., processors BCP0000_a, BCP0000_b, BCP0001_a, BCP0001_b, BCP0002_a and BCP0002_b); processors having a "Processor Type" equal to 0000 0000 0100 (i.e., SIP0000, SIP0001 and SIP0002); and processors having a "Processor Type" equal to 0000 0000 1000 (i.e., SVP0000 and SVP0001).

Figure 3:
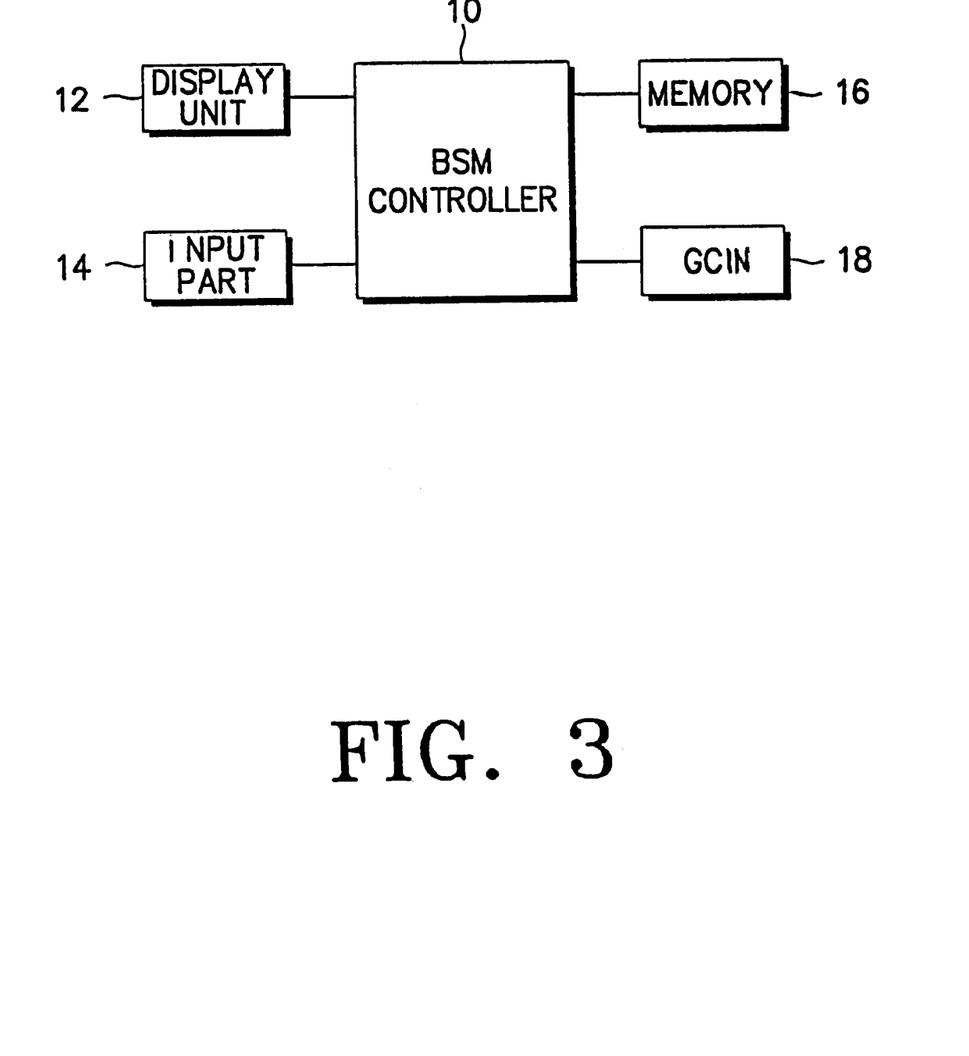
FIG. 3 is a block diagram of the BSM shown in FIG. 1.

FIG. 3 is a block diagram of the BSM shown in FIG. 1. A BSM controller 10 performs general BSM functions and processes programs in accordance with the software managing method of the present invention. An input part 14 (e.g., a keyboard) receives various types of commands and information from a manager and provides the BSM controller with the same. A display unit 12 displays various types of information in accordance with the control of the BSM controller 10. A memory 16 stores the processing program of the BSM controller 10 and various types of information, and also temporarily stores data generated during the performance of the processing program of the BSM controller 10. A GCIN (gateway communication interconnect network) 18 connects BSM controller 10 to various other devices, as shown in FIG. 1.

Figure 4A:
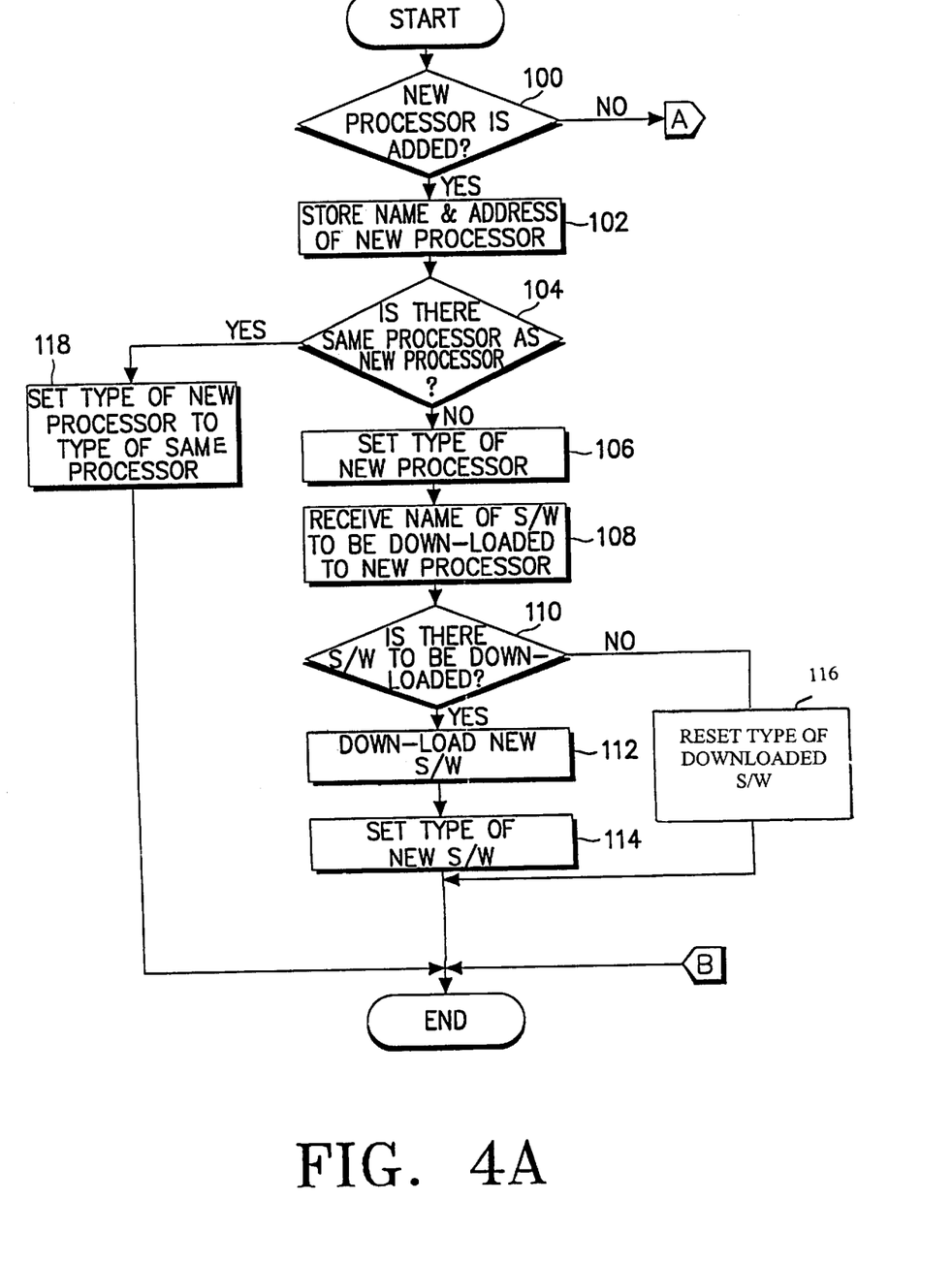
FIGS. 4A, 4B and 4C are flow charts illustrating a software managing process for managing the addition or deletion of software or processors in a CDMA base station system of a PCS according to a preferred embodiment of the present invention.
Figure 4B:
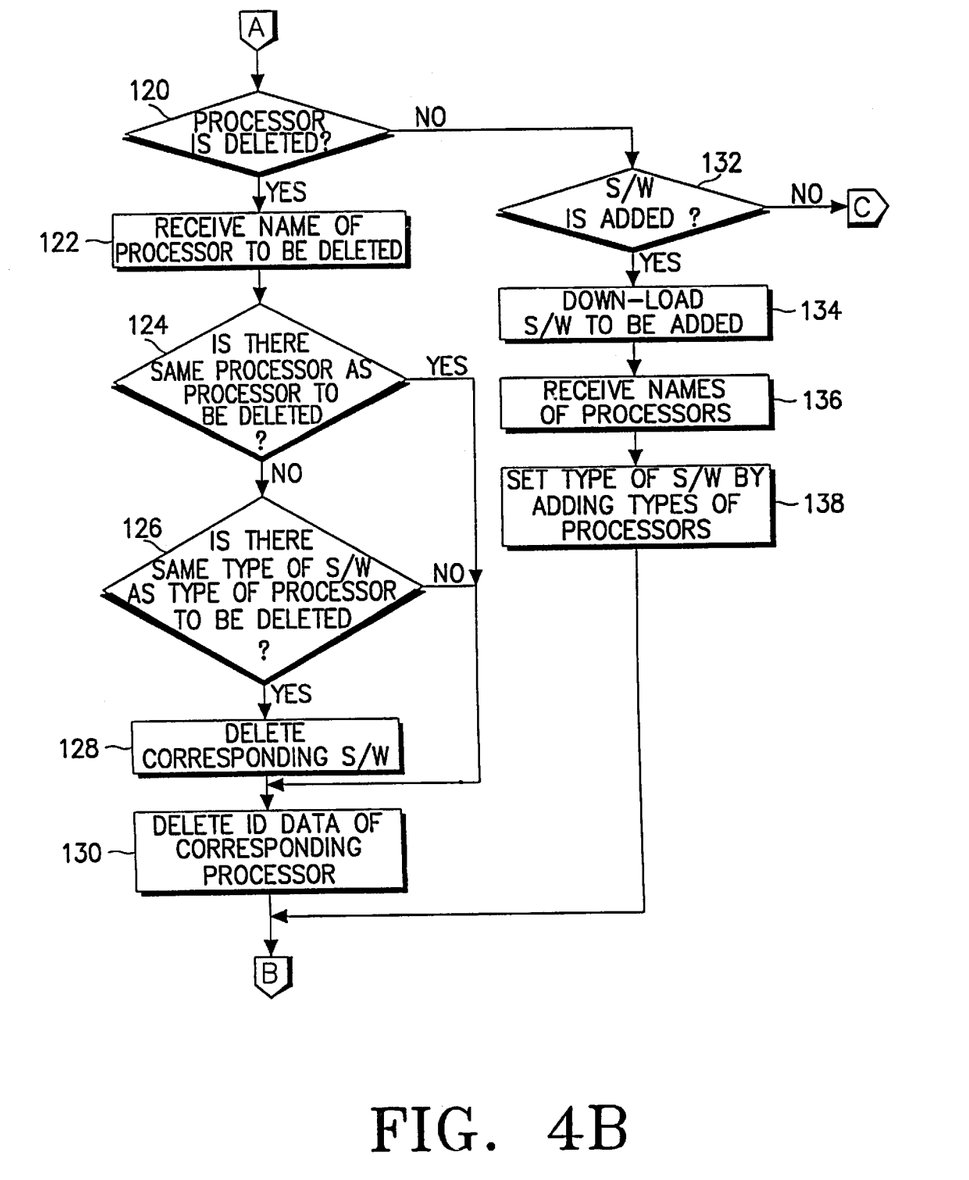
Figure 4C:
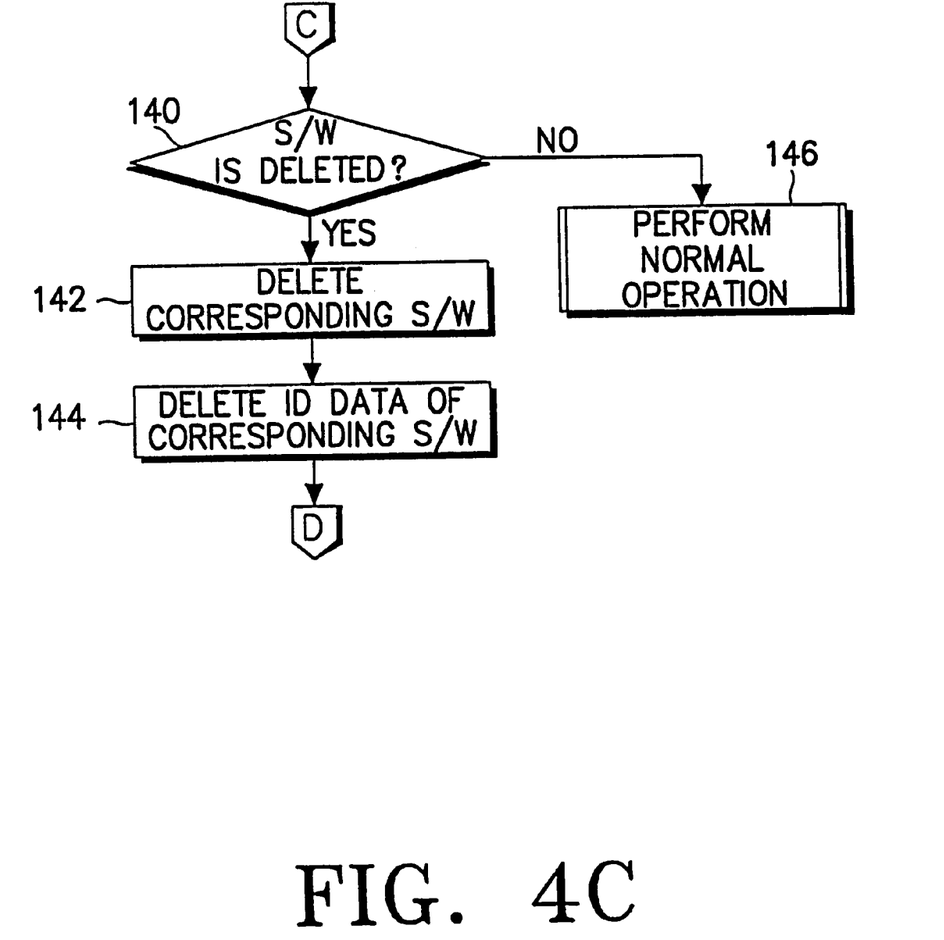

FIGS. 4A–C are a flow chart showing a software managing process for managing the addition or deletion of software or processors in a CDMA base station system of a PCS according to a preferred embodiment of the present invention. Referring to FIGS. 3 and 4A–C, BSM controller 10 determines whether or not a new processor has been added (step 100). If not, proceed to step 120. However, if a new processor has been added, then BSM controller 10 stores the name and address of the new processor inputted by an operator in the processor table (step 102).

Next, BSM controller 10 determines whether or not the processor table already includes the same type of processor as the new processor (step 104). If so, proceed to step 118 and set the processor type of the new processor to the processor type of the same processor. However, if the same type processor does not exist, then the type of the new processor is set (step 106) by locating a 1 at a position where the remaining types of processors in the processor table do not have a 1 located. That is, if the new processor is added to the processors shown in Table 1, the type of the new processor may be, for example, one of 1000 0000 0000, 0100 0000 0000, and 0010 0000 0000. When the type of the new processor is set, BSM controller 10 stores the type of the new processor in the processor table.

Then, BSM controller 10 receives the name of the software to be downloaded to the new processor (step 108). Next, at step 110, it is determined whether or not there is new software to be downloaded (i.e., software corresponding to only the new processor and thus, not listed in software table 2). If not, proceed to step 116. If there is new software to be downloaded, BSM controller 10 downloads the new software (step 112).

At step 114, the type of the new software is set as follows:

Type of New Software=Type of New Processor  (1)

At step 116, BSM controller 10 re-sets the type of the previously downloaded software (i.e., software that is already listed in software table 2) as follows:

Type of New Software=(Type of Previously-downloaded Software)+(Type of New Processor)  (2)

Thus, at step 116, an OR operation is performed between the type of the Previously-downloaded Software and the type of the New Processor (that is, each bit of the previously downloaded software type is added to the corresponding bit of the new processor type).

At step 120, it is determined whether or not a processor is to be deleted. If not, proceed to step 132. However, if a processor is to be deleted, then BSM controller 10 receives the name of the processor to be deleted (step 122).

Next, it is determined whether or not the processor table includes the same type of processor that is to be deleted (step 124). If it does, proceed to step 130. However, if the same type of processor is not included in the processor table, then it is determined whether or not there is software of the same type as the type of processor to be deleted (step 126). Software of the same type as the type of processor to be deleted is software which is only downloaded to that type of processor. If there is no such software, proceed to step 130. However, if there is such software, then BSM controller 10 deletes the corresponding software (step 128). The ID data of the corresponding processor, that is, the name, type and address of the corresponding processor, are deleted (step 130).

At step 132, it is determined whether or not software is to be added. If not, proceed to step 140 (FIG. 4C). However, if software is to be added, then BSM controller 10 downloads the software to be added (step 134). The BSM controller receives the names of the processors that are to receive the downloaded software (step 136). Next, the software type is set (step 138). As stated above, a single type of software may be downloaded to multiple types of processors. Thus, the software type is set by performing an OR operation between the processor types that are to receive the downloaded software, as expressed by the following equation:

Type of Software=(Type of First Processor )+(Type of Second Processor)+( . . . )+(Type of N-th Processor)  (3)

That is, the software type is set by performing an OR operation between the type of the first processor, the type of the second processor, and so on, up to the type of the N-th processor which is to receive downloaded software. The OR operation adds the respective bits of the processor types to set the software type. For example, in order to determine the software type of a software which is to be downloaded to processor types 0000 0000 0010, 0000 0000 0100, and 0000 0000 1000, the respective software types are ORed (i.e., added) as follows:

| processor type | corresponding processor name |
|---|---|
| 0000 0000 0010 | BCP0000_a, BCP0000_b, BCP0001_a, BCP0001_b, BCP0002_a and BCP0002_b |
| 0000 0000 0100 | SIP0000, SIP0001 and SIP0002. |
| 0000 0000 1000 | SVP0000 and SVP0001. |
| 0000 0000 1110 = | software type (corresponding to software plx) |

When the software type is set, it is stored in the software table.

At step 140, it is determined whether or not software is to be deleted. If not, proceed to step 146 and perform a normal operation. However, if software is to be deleted, then BSM controller 10 deletes the corresponding software (step 142). Next, ID data of the corresponding software is deleted (step 144).

The above-described software managing process will now be summarized. If the operator adds a processor, the ID data of the added processor is supplied to the BSM. This is so the BSM can identify the particular processor when the loader software of the particular processor demands the loading of necessary software from the BSM. After the processor is added, the operator inputs the name and address of the added processor which is stored by the BSM in the processor table. If the same type of processor as the added processor already exists, the operator supplies information indicating such condition to the BSM. However, if the same type of processor as the added processor does not exist, then the BSM sets the processor type of the added processor so as to not overlap with previously set processor types, and stores the added processor type in the processor table. Further, in such a case, information about the software necessary for the added processor is inputted by the operator. Thereafter, the BSM downloads the software necessary for the added processor and the sets the software type to the type of the added processor (since the software is only needed for the added processor). However, if the processor requires previously downloaded software, the BSM re-sets the type of the previously downloaded software to the result of an OR operation between the type of the previously downloaded software and the type of the added processor.

If software is to be added to the CDMA base station system, the BSM downloads the software to be added. The operator inputs the names of the processors to receive the downloaded software. The BSM reads the processor types of the processors to receive the downloaded software and ORs them together. Then, the BSM sets the software type to the result of the OR operation. If software is to be deleted, the BSM receives the name of the software to be deleted and deletes the ID data of the corresponding software.

Figure 5A:
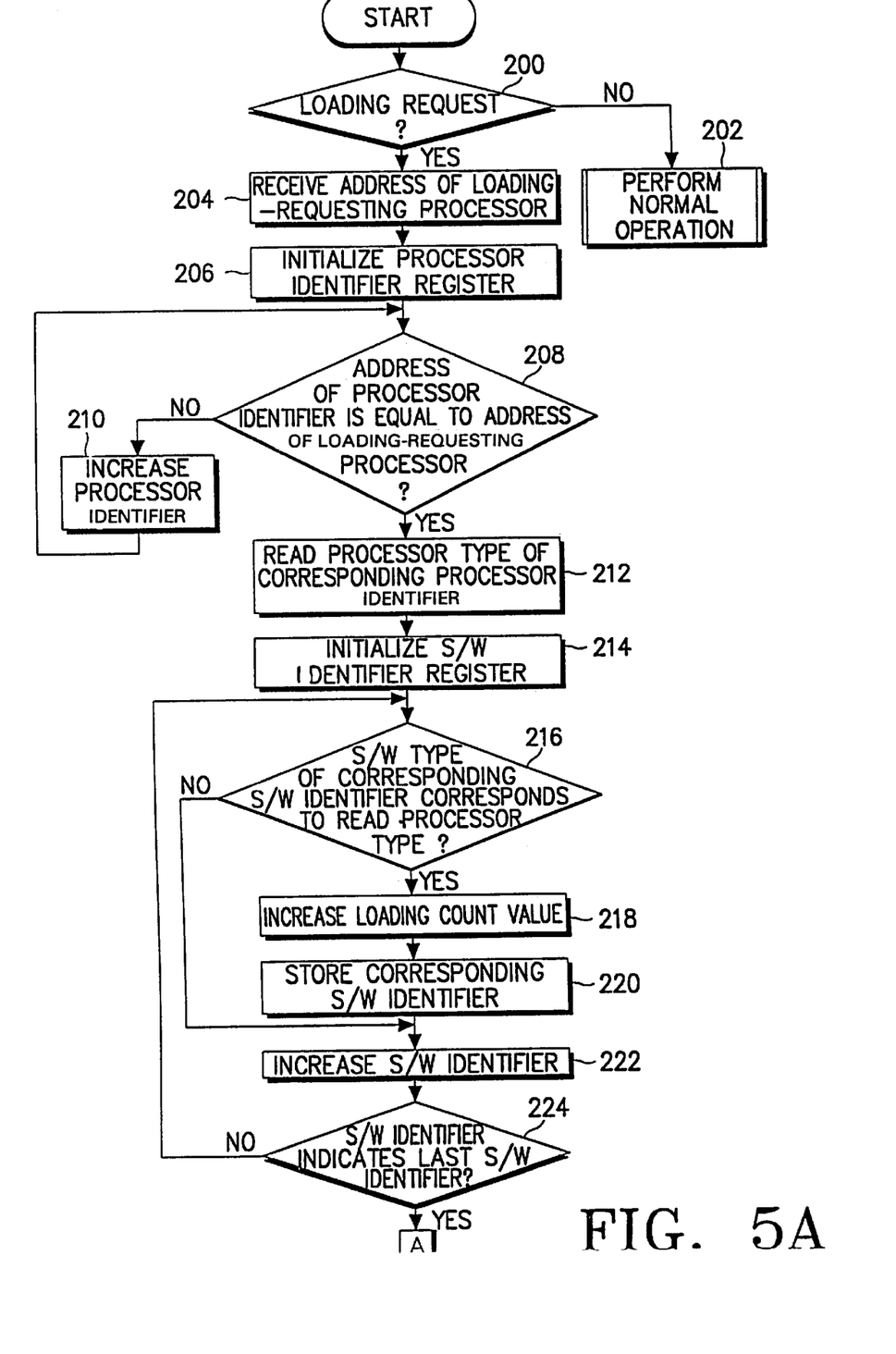
FIGS. 5A, 5B and 5C are flow charts illustrating a process for downloading software from a upper processor to a lower processor according to a preferred embodiment of the present invention.
Figure 5B:
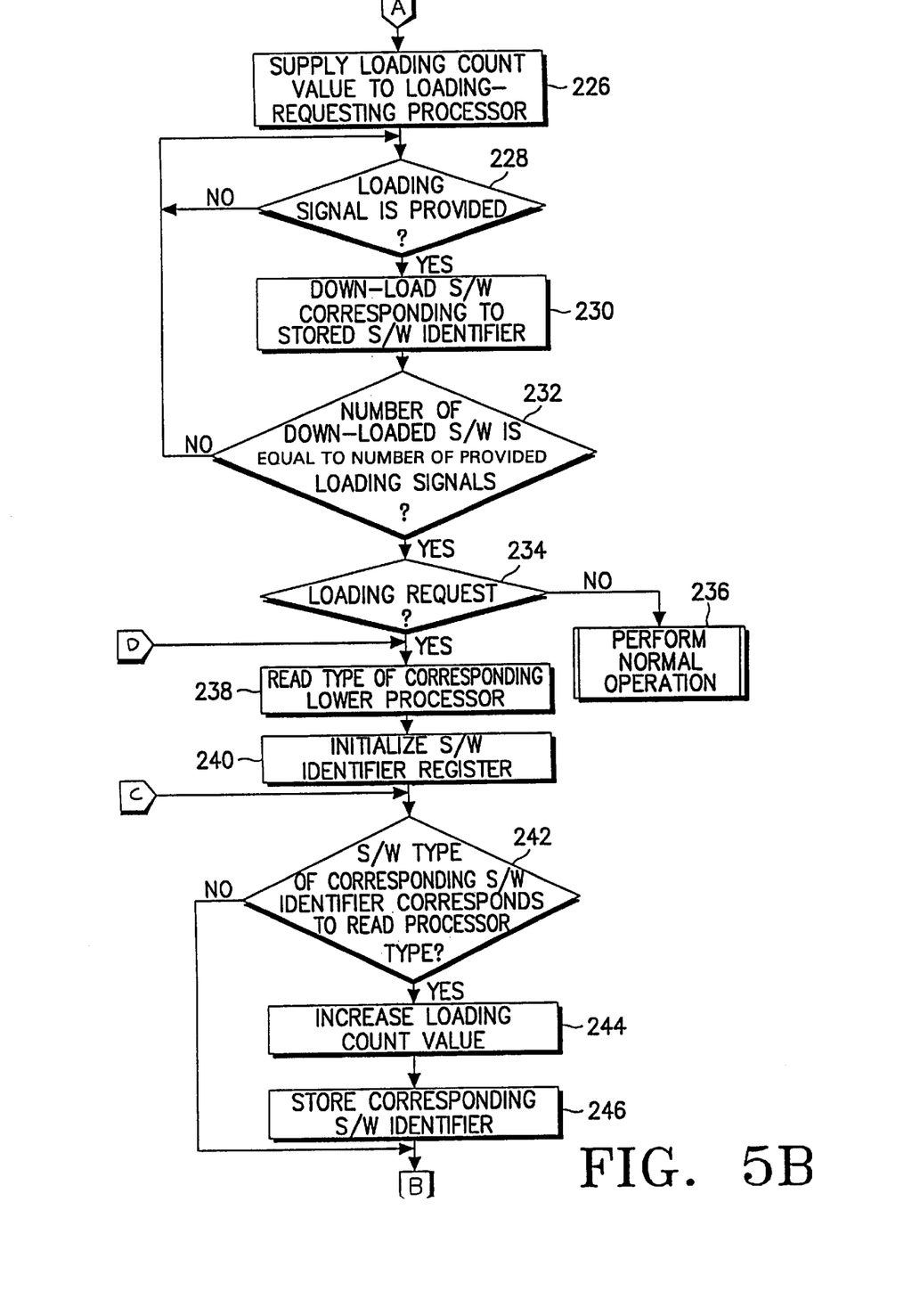
Figure 5C:
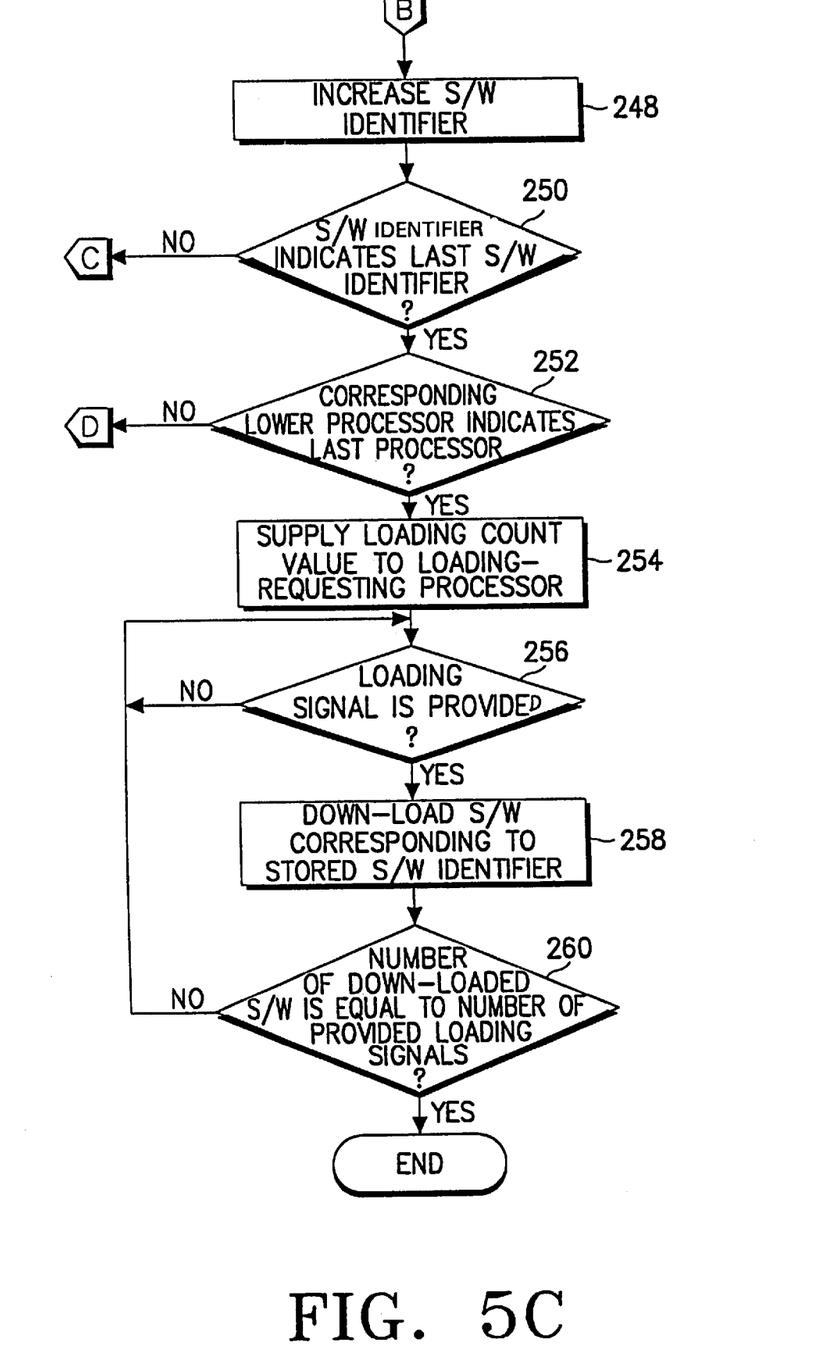

A method for downloading software from an upper processor to a lower processor is shown in FIGS. 5A–5C. BSM controller 10 determines whether or not there is a software loading request from a lower processor (step 200). If not, a normal operation is performed (step 202). However, if there is a software loading request from a lower processor, then BSM controller 10 receives the address of the lower processor generating the loading-request (hereinafter referred to as the "loading-requesting processor") (step 204), and a processor identifier register is initialized (step 206).

Next, it is determined whether or not the address of a processor having a processor identifier corresponding to a value in the processor identifier register is equal to the address of the loading-requesting processor (step 208). If the addresses are not equal to each other, the value of the processor identifier in the processor identifier register is increased (step 210) and then, a return is made to step 208. However, if the addresses are equal to each other, then the processor type of the corresponding processor identifier is read (step 212).

A software identifier register is initialized (step 214). Next, it is determined whether or not the software type having a software identifier corresponding to a value in the software identifier register corresponds to the processor type read at step 212 (step 216). If not, then proceed to step 222. However, if the software type corresponds to the read processor type, then a loading count value is increased (step 218). The corresponding software identifier is stored (step 220), and then the value of the software identifier in the software identifier register is increased (step 222).

Next, it is determined whether or not the software identifier in the software identifier register indicates the last software identifier (step 224). If not, return to step 216. However, if the software identifier indicates the last software identifier, then the loading count value is supplied to the loading-requesting processor (step 226).

Next, it is determined whether or not a loading signal is supplied from the loading-requesting processor (step 228). If not, return to step 228. However, if a loading signal is supplied from the loading-requesting processor, then the software corresponding to the stored software identifier is downloaded (step 230).

It is determined whether or not the number of the downloaded softwares is equal to the number of the provided loading signals (step 232). If not, return to step 228. However, if they are equal to each other, then it is determined whether or not there is a loading request from a lower processor of the loading-requesting processor (step 234). If not, a normal operation is performed (step 236). However, if there is a loading request from a lower processor, then the type of the corresponding lower processor is read (step 238).

Next, the software identifier register is initialized (step 240). It is determined whether or not the software type having a software identifier corresponding to a value in the software identifier register corresponds to the processor type read at step 238 (step 242). If not, proceed to step 248. However, if the software type corresponds to the processor type, then the loading count value is increased (step 244).

The corresponding software identifier is stored (step 246), and then increased (step 248). Next, it is determined whether or not the software identifier indicates the last software identifier (step 250). If not, return to step 242. However, if the software identifier indicates the last software identifier, then it is determined whether or not the corresponding lower processor indicates the last lower processor (step 252). If not, return to step 238. However, if the corresponding lower processor indicates the last processor, then the loading count value is supplied to the loading-requesting processor (step 254).

Next, it is determined whether or not the loading signal is provided from the loading-requesting processor (step 256). If not, return to step 256. However, if the loading signal is provided from the loading-requesting processor, then the software corresponding to the stored software identifier is downloaded to the loading-requesting processor (step 258).

Next, it is determined whether or not the count number of the downloaded softwares is equal to the number of the provided loading signals (step 260). If not, return to step 256. However, if they are equal to each other, then the downloading operations are ended.

Figure 6:
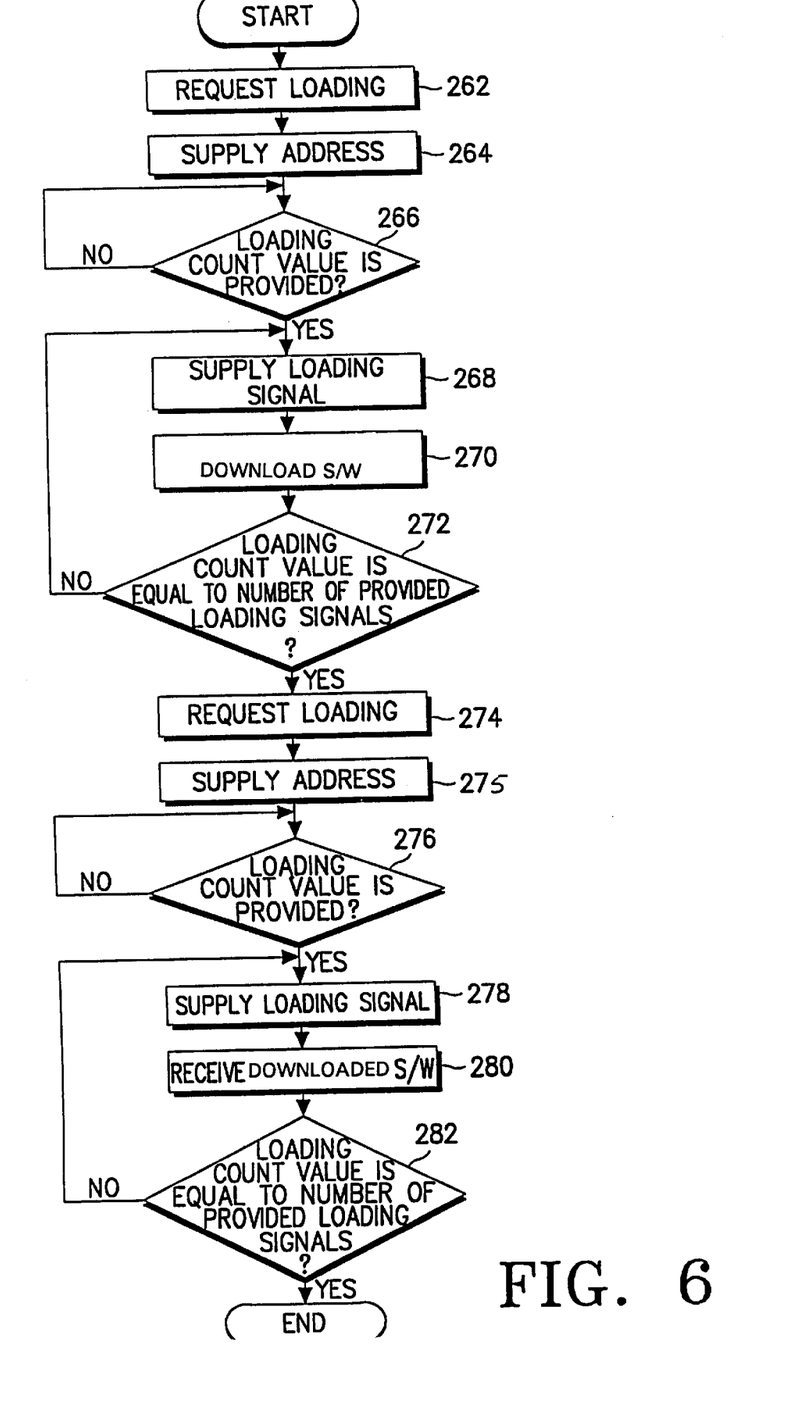
FIG. 6 is a flow chart showing a downloading process from a BSM to a CCP according to a preferred embodiment of the present invention.

The loading-requesting processor may be the CCP. Thus, the CCP can receive downloaded software from the BSM. A method for downloading software from the BSM to the CCP is shown in FIG. 6.

The CCP requests BSM controller 10 (which is the upper processor) to (down) load software (step 262). The CCP supplies its address to BSM controller 10 (step 264).

Then, it is determined whether or not a loading count value is supplied from the BSM controller (step 266). If not, return to step 266. However, if a loading count value is supplied from the BSM controller, then the CCP supplies the loading (request) signal to the BSM controller (step 268). The software is downloaded to the CCP from the BSM controller (step 270). The CCP increases the loading count value.

Next, it is determined whether or not the loading count value is equal to the number of the provided loading signals (step 272). If not, return to step 268. However, if they are equal, then the CCP requests the BSM controller to load the software to the lower processor (step 274). The CCP supplies its address to the BSM controller (step 275).

Then, it is determined whether or not the loading count value is supplied from the BSM controller (step 276). If not, return to step 276. However, if the loading count value is supplied from the BSM controller, then the CCP supplies the loading signal to the BSM controller (step 278). The software is downloaded to the lower processor (step 280). The CCP increases the loading count value.

Next, it is determined whether or not the loading count value is equal to the number of the provided loading signals (step 282). If not, return to step 278. However, if they are equal to each other, then the downloading operations are ended.

In summary, if there is a loading request from the lower processor, the upper processor reads the lower processor type with reference to the address provided from the lower processor. If the lower processor type is read, the upper processor sequentially performs an AND operation between the bit position of the type of the lower processor having a 1 and the corresponding position of the software type. The upper processor downloads the software to the lower processor when the result of the AND operation equals 1.

For example, under the state that the BSM downloads the software to the CCP, if there is a load request from the processor SIP0000 (which has a processor type of 0000 0000 0100), the CCP sequentially performs an AND operation between the bit position of the type of the lower processor having a 1 (i.e., the third from last bit) and the corresponding position of the software type. The softwares in which the result of the AND operation equals 1 are rmos_sip (0000 0000 0100), p1x (0000 0000 1110) and tmnx (0000 0000 0100). Therefore, the CCP downloads the softwares rmos_sip, p1x and tmnx to the processor SIP0000.

If the processor SIP0000 is deleted, information about the processor SIP0000 is deleted from the processor table. The softwares rmos_sip, p1x and tmnx cannot be downloaded even though they are left in the software table. This is because the processor SIP0000 cannot request the upper processor to load the software since the processor has been deleted. Moreover, since there are no other processors having a processor type with 1's located in the same positions as the 1's in the processor type corresponding to the processor SIP0000, the softwares rmos_sip, p1x and tmnx are not detected by or associated with the other processors.

If a processor SIP0010 is added, the BSM sets the processor type SIP0010. In the example of Table 1, the processor type SIP0010 may be one of 1000 0000 0000, 0100 0000 0000 and 0010 0000 0000. If 1000 0000 0000 is set as the processor type for processor SIP0010, the BSM receives information about the software to be downloaded to the processor SIP0010 and then sets the software type. If the software names and types are shell (0000 0000 0001) and rmos_csp (0000 1000 0000), i.e., previously downloaded software, the BSM sets the new software type by adding 1000 0000 0000 (which is the processor type of processor SIP0010) to the respective software types. Therefore, the software types for shell and rmos_csp are set to 1000 0000 0001 and 1000 1000 0000, respectively.

If a new software is added, the BSM sets the software type by adding the types of the processors to which the new software is to be downloaded. Therefore, even if a new processor or software is added or deleted, there is no need to modify the loader software.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. In a personal communication system (PCS) comprising at least one base station manager (BSM) for downloading softwares to processors of a plurality of PCS devices, a method for managing software, comprising the steps of:
   (a) setting a processor type to each processor, where each processor type is a string of bits including a plurality of bits equal to 0 and one bit equal to 1, and similar processor types have an identical string of bits and dissimilar processor types differ in that bit positions equal to 1 do not overlap;
   (b) setting a software type to each software, where each software type is a string of bits including a plurality of bits equal to 0 and at least one bit equal to 1, and each software type corresponds to at least one processor type by having a bit equal to 1 located in the same position as the bit equal to 1 in the processor type;
   (c) determining a processor type of a processor generating a loading request; and
   (d) downloading a software to the processor when a result of an AND operation between the bit position equal to 1 of the processor type and the corresponding bit position of a software type of the software equals 1.

2. The method of claim 1, wherein a newly added processor has its processor type set according to step (a).

3. The method of claim 1, wherein a newly added software has its software type set according to step (b).

4. The method of claim 2, wherein the software type of a new software corresponding to the newly added processor is set to the processor type of the newly added processor.

5. The method of claim 2, wherein the software type of a previously downloaded software corresponding to the newly added processor is set to the sum of an OR logic function which ORs the software type of the previously downloaded software and the processor type of the newly added processor.

6. The method of claim 1, further comprising the step of deleting a type of a processor to be deleted.

7. The method of claim 1, further comprising the step of deleting a type of a software to be deleted.

8. The method of claim 1, wherein the processor types and the software types both have the same number of bits.

9. The method of claim 1, wherein the software type of a newly added software which does not correspond to a newly added processor is set to a sum of an OR logic function which ORs the processor types of the processors which are to receive the newly added software.

10. In a personal communication system (PCS) comprising at least one base station manager (BSM) for downloading softwares to processors of a plurality of PCS devices, a method for managing software, comprising the steps of:
   (a) setting a processor type to each processor including newly added processors, where each processor type is a string of a predetermined number of bits including a plurality of bits equal to 0 and one bit equal to 1, and similar processor types have an identical string of bits and dissimilar processor types differ in that bit positions equal to 1 do not overlap;
   (b) setting a software type to each software including newly added softwares, where each software type is a string of bits of the same predetermined number of bits as the processor types and includes a plurality of bits equal to 0 and at least one bit equal to 1, and each software type corresponds to at least one processor type by having a bit equal to 1located in the same position as the bit equal to 1 in the processor type;
   (c) determining a processor type of a processor generating a loading request; and
   (d) downloading a software to the processor when a result of an AND operation between the bit position equal to 1 of the processor type and the corresponding bit position of a software type of the software equals 1.

11. In a personal communication system (PCS) comprising at least one base station manager (BSM) for downloading softwares to processors of a plurality of PCS devices, a method for downloading software from an upper processor to a loading-requesting processor, comprising the steps of:
   (a) reading a processor type of a processor having an address equal to an address of the loading-requesting processor, the read processor having a processor identifier corresponding to a value in a processor identifier register;

(b) reading a software type;

(c) incrementing a loading count value, when the read software type of a software corresponds to the read processor type, the software having a software identifier corresponding to a value in a software identifier register;

(d) storing the corresponding software identifier;

(e) increasing the value in the software identifier register;

(f) supplying the loading count value to the loading-requesting processor, when the software identifier in the software identifier register indicates a last software identifier;

(g) returning to step (b) when the software identifier in the software identifier register does not indicate the last software identifier;

(h) downloading softwares corresponding to the stored software identifiers;

(i) determining the processor type of a lower processor of the loading-requesting processor; and (j) downloading softwares of software types corresponding to the processor type.

12. The method of claim 11, wherein step (h) comprises the steps of:

(h1) supplying the loading count value to the loading-requesting processor;

(h2) downloading a software corresponding to a stored software identifier, when a loading signal is supplied from the loading-requesting processor.

(h3) determining whether the loading count value is equal to the number of the supplied loading signals; and (h4) returning to step (h2) when the loading count value is not equal to the number of the supplied loading signals.

13. The method of claim 11, wherein step (i) comprises the steps of:

(i1) determining whether or not there is a loading request from a lower processor of the loading-requesting processor, when the number of the downloaded softwares is equal to the number of the provided loading signals; and (i2) reading a processor type of the lower processor, when there is a loading request from the lower processor;

and wherein step (j) comprises the steps of:

(j1) reading a software type;

(j2) incrementing a loading count value, when the read software type of a software corresponds to the read processor type, the software having a software identifier corresponding to a value in a software identifier register;

(j3) storing the corresponding software identifier;

(j4) increasing the value of the software identifier in the software identifier register;

(j5) determining whether or not the software identifier indicates a last software identifier;

(j6) returning to step (j1) when the software identifier does not indicate the last software identifier; and (j7) downloading softwares corresponding to the stored software identifiers.

14. The method of claim 13, wherein step (j7) comprises the steps of:

(j7.1) supplying the loading count value to the loading-requesting processor;

(j7.2) downloading a software corresponding to a stored software identifier, when a loading signal is supplied from the loading-requesting processor;

(j7.3) determining whether the loading count value is equal to the number of the supplied loading signals; and (j7.4) returning to step (j7.2) when the loading count value is not equal to the number of the supplied loading signals.

15. In a personal communication system (PCS) comprising at least one base station manager (BSM) for downloading softwares to processors of a plurality of PCS devices, a method for downloading software from an upper processor to a loading-requesting processor, comprising the steps of:

(a) determining the processor type of the loading-requesting processor;

(b) reading a software type;

(c) storing a software identifier corresponding to the read software type, when the read software type corresponds to the determined processor type;

(d) returning to step (b) when the last software type has not been read;

(e) downloading softwares corresponding to the stored software identifiers;

(f) determining the processor type of a lower processor of the loading-requesting processor;

(g) reading a software type;

(h) storing a software identifier corresponding to the read software type, when the read software type corresponds to the determined processor type;

(i) returning to step (g) when the last software type has not been read; and (j) downloading softwares corresponding to the stored software identifiers.

* * * * *